Patented Feb. 28, 1933

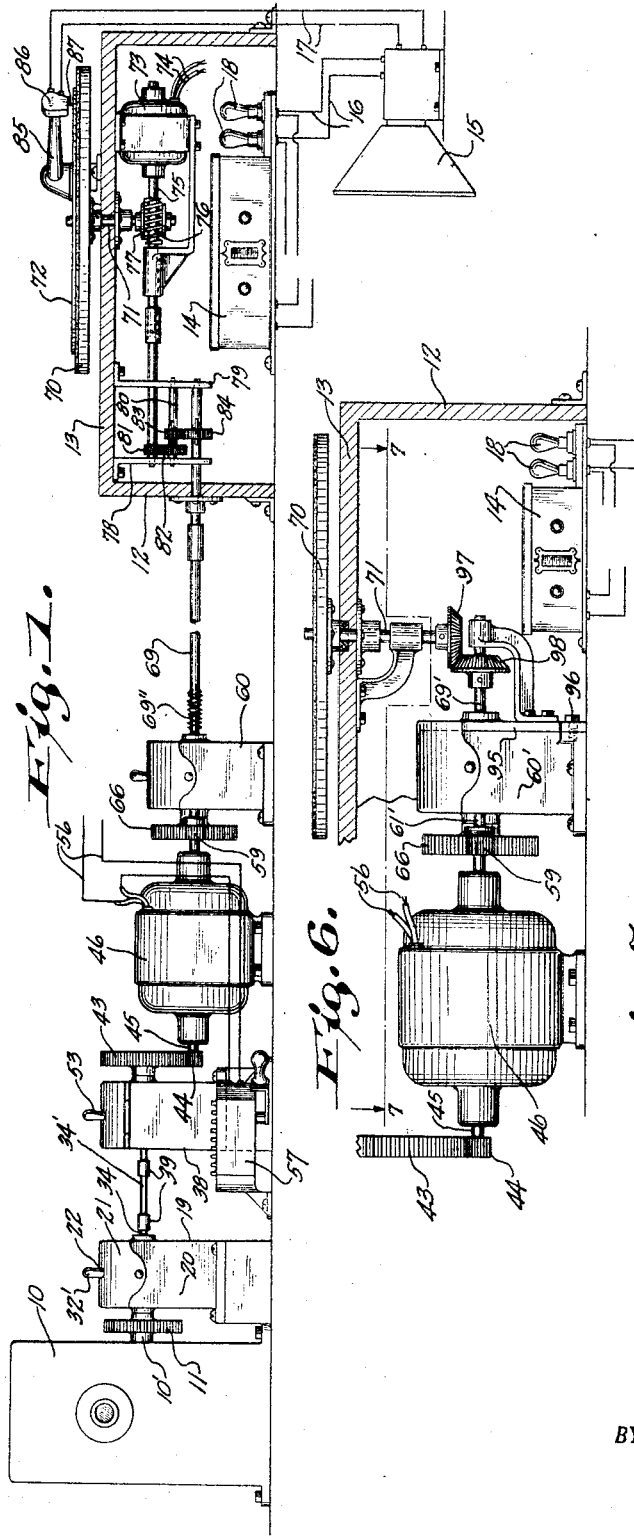

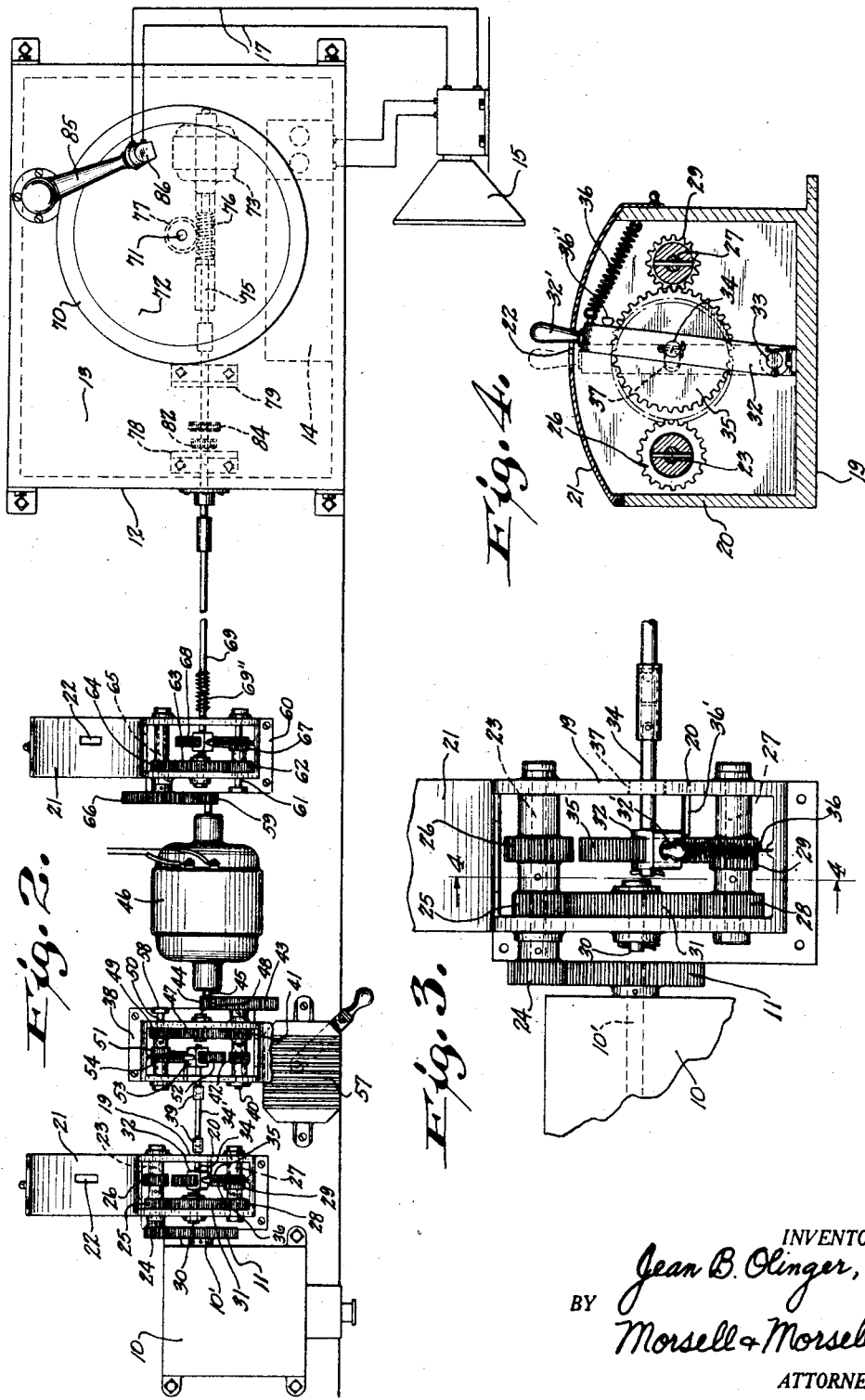

1,899,048

UNITED STATES PATENT OFFICE

JEAN B. OLINGER, OF MILWAUKEE, WISCONSIN

SYNCHRONIZING AND CONTROL MECHANISM FOR SOUND AND MOTION PICTURE APPARATUS

Application filed November 28, 1930. Serial No. 498,672.

This invention relates to improvements in synchronizing and control mechanism for sound and motion picture apparatus.

One of the objects of the present invention is to provide a simple, easily operated, mechanical apparatus, which shall enable the operator of a moving picture machine, from his booth, to control a moving picture machine so that the reproductions of the film on the screen may be kept in strict synchrony with a sound reproducing mechanism which produces a sound record corresponding to the film being exhibited.

A further object of the invention is to provide an apparatus for interposition between a motion picture machine and a sound reproducing machine which will permit of a number of combinations in the operation and control of the two machines, said apparatus being easily manipulated to speed up or retard the motion picture machine to bring it into synchrony with the sound reproducing machine if the necessity arises without interfering with the sound reproduction, said apparatus permitting the operation of the motion picture machine independently of the sound reproducing machine, or vice versa, and the control of the apparatus to effect any of these results or changes being easily made by the operator at the operator's station.

A further object of the invention is to provide in combination with a motion picture machine and a combination radio and phonograph, a synchronizer and control therefor permitting the operation of the phonograph or radio with or without the simultaneous operation of the motion picture machine.

When sound records of a talking motion picture are taken or recorded, there is a certain speed ratio between the sound recording mechanism and the moving picture talking mechanism, and when the motion picture and sound record are reproduced it is necessary that the same speed ratio be maintained between the film projecting machine and the sound reproducing machine. To that end the present invention aims at an apparatus which can be set or arranged so that a sound record will be operated at a certain predetermined speed ratio with respect to the film projector to insure correct and harmonious reproduction.

A further object of the invention is to provide a sound apparatus and motion picture synchronizer and control which is relatively inexpensive to manufacture and install, is simple in its construction and operation, permits the attainment of a number of desirable results in the operation of motion picture and sound reproducing mechanisms, is strong and durable, and is well adapted for the purposes described.

With the above and other objects in view, the invention consists of the improved sound apparatus and motion picture synchronizer and control, and its parts and combinations as set forth in the claims, and all equivalents thereof.

In the accompanying drawings in which the same reference characters indicate the same parts in all of the views:

Fig. 1 is a front view of the improved synchronizing and controlling mechanism interposed between and operatively connected with respectively, a motion picture machine, and a combination phonograph and radio, a portion of the enclosing cabinet of the phonograph and radio being in section to show mechanism therein;

Fig. 2 is a plan view of the showing in Fig. 1, with the covers of the synchronizing and control units opened to show the gearing therein;

Fig. 3 is an enlarged plan view of a synchronizing and control unit with its cover opened with fragmentary showings of adjacent and connected parts;

Fig. 4 is a sectional view taken on line 4—4 of Fig. 3 with the cover closed;

Fig. 5 is a wiring and schematic diagram;

Fig. 6 is an enlarged side view, partly in section, of a modification of a portion of the apparatus; and Fig. 7 is a view taken on line 7—7 of Fig. 6.

Referring now more particularly to the drawings, it will appear that the numeral 10 indicates a motion picture machine adapted for location in some convenient position, as the operator's booth, in the rear of a theater or auditorium. The particular type of motion picture machine is unimportant, other than it have a positively driven part such as a shaft or other positively driven connection. For sake of illustration there has been shown an outer gear wheel 11 for connection.

In relative proximity to the motion picture machine there is disposed a sound reproducing apparatus which is indicated generally by the numeral 12, and in the specific embodiment shown comprises a combination phonograph and radio, preferably encased in a suitable cabinet or housing 13, the radio being designated by the numeral 14. To amplify the sounds issuing from either the phonograph or the radio, a loud-speaker or power amplifier 15 is provided. Said loud speaker in actual practice is preferably located on or adjacent the stage of the theater or auditorium in proximity to the screen onto which the motion picture film is projected, whereby it will appear that the sounds come directly from the screen. Said loud speaker is connected with the radio by circuit wires 16 and with the phonograph by circuit wires 17. In one of the circuits to the loud speaker there are amplifying tubes 18.

A vital feature of the invention is a synchronizing and control mechanism interposed between and operatively connected with both the motion picture machine and the sound reproducing apparatus. Referring first particularly to Figs. 1 and 2, it will appear that immediately adjacent the motion picture machine 10 is disposed a synchronizing and control unit designated generally by the numeral 19. Said unit comprises an outer casing 20 having an open upper end normally closed by a hinged cover 21 having a slot 22 therein. Journaled transversely within the casing 20, adjacent one end thereof, is a shaft 23 and on an external portion of said shaft is keyed a gear 24 in mesh with the gear 11 on the driving shaft 10' of the motion picture machine, or with any other type of direct driving means of the motion picture machine. There is also mounted fast on said shaft 23 within the casing a gear 25 and a slightly larger gear 26. Within the casing adjacent the other end is journaled a second transverse shaft 27 on which are mounted fast, in spaced relation, gears 28 and 29. Intermediate the shafts 23 and 27 is a stud shaft 30 having thereon a large gear 31 which is in mesh with gear 25 on shaft 23 and gear 28 on shaft 27. A forked lever 32 has its lower end portions pivotally mounted on a short rod 33 within the lower portion of said casing, and the inner end portion of a shaft 34 is journaled through intermediate portions of said forked lever and has mounted fast thereon a driven large gear 35. Said forked lever has a manipulating upper end portion 32' extending through the slot 22 in the cover 21. Connected between the forked lever and a front portion of the casing is a coiled spring 36 which normally functions to hold said lever in a forwardly inclined position with its gear 35 in mesh with the gear 29. However, the forked lever may be pushed rearwardly against the tension of the spring 36 to disengage the gear 35 from the gear 29 and to engage it with the larger gear 26. The driving shaft 34 extends through a slot 37 in a side wall of the casing so as to permit movement of the shaft with shifting movements of the forked lever. A projection or gauge 36' limits the forwardly urged movement of said lever to prevent the gears from binding.

Positioned adjacent the synchronizing and control unit 19 is a second synchronizing and control unit 38 out of a side of which a shaft 34' extends, and said outer portion of the shaft 34' has a flexible coupling or connection 39 with the adjacent portion of the shaft 34. Said synchronizing and control unit 38 is very similar to the control unit 19 but is in a reversed position with respect thereto. It should be observed that the forward shaft 40 therein carries fast thereon gears 41 and 42, and also a large external gear 43 which is in mesh with and driven by a small gear 44 of the motor shaft portion 45 of an electric motor 46. The gear 41 meshes with a large gear 47 on an intermediate stud shaft 48, which large gear also meshes with a smaller gear 49 fast on a rear shaft 50, the rear shaft being slidably or longitudinally movably mounted in the casing. There is also fast on the shaft 50 a gear 51 slightly smaller than the gear 42 on the forward shaft 40. Said gear 51 is normally engaged by a large gear 52 shiftably carried by a pivotally mounted forked lever 53, and said gear turns the shaft 34' which extends to the synchronizing and control unit 19. By pulling the forked lever 53 forwardly against the force of the spring 54, the gear 52 can be disengaged from the gear 51 and engaged with the slightly larger gear 42 whereby the gear 52 and shaft 34' will be driven somewhat more rapidly.

The detailed operation of all of the mechanism to the left of the motor 46 in Fig. 2 is as follows: Said motor, serving as a prime mover, receives current from a source of supply (designated 55 in Fig. 5) through circuit wires 56 and in the circuit to said motor is a rheostat 57. The driven motor shaft portion 45, through the meshing gears 44 and 43 turns the shaft 40 in the synchronizer and control unit 38. With the parts disposed as shown, both of the gears 41 and 42 on said shaft will turn therewith, and gear 41 will drive the opposite shaft 50 through the large idler gear 47 and the meshing gear 49. Gear 51 on shaft 50 is in mesh with the shiftable gear 52 and thereby the elongated shaft 34' and the connected portion 34 are driven. Power is brought thereby into the synchronizer and control unit 19, and the gear 35 therein, on shaft 34, is driven and drives shaft 27 through the engagement of gear 35 with gear 29. Also, through gears 28, 31 and 25, the rear shaft 23 is turned and thus turning movement is imparted to the operative mechanism within the motion picture machine through gears 24, 11, and the shaft 10' or any other connected positive driving means.

Now, if it becomes desirable to retard the speed of the motion picture machine, a simple manipulation of the forked lever 32 of the unit 19 makes this result possible. By moving said lever rearwardly, gear 35 is engaged with gear 26 instead of gear 29 (the former being larger than the latter) and as a result, the speed of rotation of the shaft 23 and mechanism receiving rotation therefrom is retarded. When pressure on said forked lever 32 is released the spring 36 will return it to its forward position, again bringing gear 35 into engagement with forward gear 29 and re-establishing the original driving speed.

The second synchronizer and control unit 38 makes it possible, through a manipulation of the forked lever 53 therein, to speed up the motion picture machine. This is accomplished by moving said lever forwardly, disengaging gear 52 from gear 51 and engaging gear 52 with gear 42. The latter gear is somewhat larger than the previously engaged gear, gear 51, with the result that mechanism driven thereby will be driven at an increased rate of speed, which increase of speed is transmitted to the moving picture mechanism.

A further function served by said synchronizer and control unit 38 is the entire disengagement of the motion picture mechanism from the driving motor 46. This is accomplished by pressing inwardly on the button end 58 of shaft 50 of the unit 38, sliding said shaft to the left in Fig. 2, causing disengagement of the gear 49 with respect to the gear 47, but retaining partial mesh of gears 51 and 52 to facilitate reverse shifting of the shaft and remeshing of the gears. There will then be no driving connection between the shaft 50, which transmits motion to the outgoing shaft 34', and the motor driven shaft 40. To reestablish the drive for and operation of the motion picture machine it is merely necessary to push shaft 50 in the reverse direction, re-engaging gear 49 with driven gear 47.

The motor shaft 45 extends longitudinally through said motor and the opposite end of said shaft carries a small gear 59. Adjacent said side of the motor is positioned a third synchronizing and control unit 60 disposed similarly to the unit 19 and similar thereto except in the following modifications: The forward shaft 61 therein is longitudinally movable whereby gear 62 thereon may be shifted into or out of engagement with the large idler gear 63 which is in mesh with a gear 64 on a rear shaft 65. Said rear shaft is positively driven from the motor 46 through the gear 59 which meshes with a large gear 66 on an outer end of said shaft 65. When the mechanism of the unit 60 is arranged as shown in Fig. 2 rotation of the rear shaft 65 is transmitted through gears 64, 63 and 62 to the forward shaft 61, and another gear 67 on said forward shaft, meshing with an intermediate gear 68, which is fast on an outwardly extending shaft 69, causes said shaft 69 to be turned. However, if it is desired to have mechanism to the right, in Fig. 2, of the unit 60 undriven or receiving no rotative power from the motor 46, then the sliding shaft 61 is pushed to the right in Fig. 2, disengaging gears 62 and 63, and shaft 61, and gear 68 and shaft 69 will then be undriven, so far as the motor 46 is concerned, but gears 67 and 68 will remain partly in mesh.

It is to be noted that the shaft 69 is split and is formed with a yielding coupling 69'' in the form of a surrounding spring which spring is formed of a pair of reversely wound wires. Said coupling absorbs shocks in the shaft 69 in both directions and yieldingly permits slight re-coiling movements between the shaft portions, which is essential to offset opposed impulses which the shaft might receive because of its interposition between two driving motors.

The sound reproducing mechanism previously mentioned, and particularly the phonograph, as shown in Figs. 1 and 2, comprises a revoluble turn table 70 mounted above the cabinet 13 on a vertical shaft 71, and said turn table is adapted to receive a disc sound record 72. Suitably supported within the cabinet 13 below the turn table is an electric motor 73 receiving current from the source of power 55 through circuit wires 74. Said motor has an elongated shaft 75 driven thereby, and an intermediate portion of said shaft carries a worm 76 engaging a worm wheel 77 on a lower portion of the vertical turn table shaft, to turn the turn table and the record thereon.

While the motor 73 is the primary instrumentality for turning the phonograph turn table, there is certain mechanism coupled therewith which serves as an aid for said motor 73 in driving the turn table, but essentially said mechanism acts as a check on the phonograph turn table at a speed greater than the established or predetermined speed ratio of the turn table with respect to the motion picture mechanism. In this connection it is to be noted that the outer end portions of shafts 69 and 75 are journaled in spaced relation in bearing brackets 78 and 79 depending from a portion of the cabinet. There is also a short intermediate shaft 80 and on the shafts 69, 75 and 80 a series of gears 81, 82, 83 and 84 provide a gear reduction suitable to establish a predetermined speed ratio between driven parts on opposite sides of this gear reduction. The gears 83 and 84 are keyed to their shafts and by removing one of the bearing brackets 79 said gears 83 and 84 may be removed from their shafts endwise and be replaced by gears of another size to establish another speed ratio for the gear reduction and other mechanism to adapt the mechanism to some other standardized speed ratio. This establishment of a predetermined speed ratio between the phonograph and the motion picture mechanism is important when it is taken into consideration that when a talking motion picture is taken or recorded there is an established speed ratio between the sound recording mechanism and the camera and in the ultimate reproduction to obtain synchrony and the best sound qualities from the sound record the same speed ratio must be maintained in the reproducing mechanism. Hence, when a speed ratio of a given production (film and sound records) is known, the correct gearing to maintain this speed ratio can be readily installed in the gear reduction, as before described.

The phonograph is arranged with the usual pivotaly mounted or swingable tone arm 85 over the turn table and disc record and the outer end of said tone arm carries a sound box 86 with a depending needle 87 to track in the groove of the sound record 72. The sound box is in circuit, through wires 17, with the loud speaker 15, so that sound vibrations or impulses are transmitted to the loud speaker for audible reproduction.

The radio 14 is of a conventional type and electrical energy is transmitted thereto from the source of power by circuit wires. The radio is also connected with the loud speaker.

The entire apparatus is arranged with a number of switches controlling circuits to various portions or elements thereof. The tone arm 85 of the phonograph cooperates with a conventional tone arm switch (common in electric phonographs), designated 88 in Fig. 5, and pivotal movements of the tone arm to and from its operative position will actuate said switch to close or open the circuit to the phonograph motor 73.

In addition, a main power line switch 89 (see Fig. 5) is provided, and said switch is disposed at any convenient position. Said switch 89 is the master switch and operation of no part of the apparatus can take place until said switch is closed. Said master switch 89 controls the circuits to both of the motors 46 and 73 respectively, and also the circuit to the amplifying tubes 18. Also, as previously mentioned, there is a rheostat switch 57 in the circuit to the main motor 46.

The improved motion picture machine and sound reproducing mechanism synchronizer and control is adapted for installation in a theater or auditorium, and the entire apparatus, with the exception of the loud speaker, can be confined within relatively small limits within the operator's booth. In the operation of the apparatus the master switch 89 is first closed. This will permit the supply of current to both of the motors and to the tubes 18. Then the rheostat switch 57 is turned on and the phonograph tone arm is swung to position the needle 87 on the proper portion of the sound record 72 on the turn table 70. The motion picture machine and phonograph will then be in simultaneous operation and, barring irregularities, in synchrony, and further both portions of the apparatus will be operating at the desired speed ratio. Supposing, however, that the operator observes that the film is somewhat ahead of the sound record, caused by a break in the film or for other reasons. Then, the operator will press the forked lever 32 of the control unit 19 to the rear, and by the arrangement previously described, the motion picture machine will be caused thereby to run more slowly, and as soon as the film has been retarded sufficiently long to again be in synchrony with the sound, the lever 32 will be released and the parts will operate as formerly.

On the other hand, if for any reason, the film should become retarded behind the sound, then the operator will pull forwardly on the forked lever 53 in the control unit 38, and by the arrangement previously described, the motion picture machine will be accelerated in its operation and when the film catches up to the sound the lever is released, and the parts again operate as heretofore. In both of the afore-described operations to effect synchrony of the film and sound record, it should be observed that only the operation of the film is affected, and there is no change of speed of the sound record. This is advantageous as a constant speed for the sound record insures the best reproduction thereof.

It may happen that the operator may temporarily wish to abate operation of the motion picture machine without operating any of the switches or affecting any other portion of the apparatus. This is accomplished by pressing the shaft 50 of the unit 38 to the left, disengaging the gears 47 and 49. At any time said gears may be re-engaged to operate the motion picture machine. The aforementioned manipulation also permits operation of the phonograph without operation of the motion picture machine, as during an intermission, or other period of inactivity on the stage or screen.

The control unit 60 gives various possibilities for the operation and control of the sound reproducing mechanism. Under most conditions the phonograph will be operated with the motion picture machine. However, if it is desired to operate the phonograph without regard to a synchronous relation with the motion picture machine, this can be accomplished by moving the shaft 61 to the right which will cause a disengagement of the driving connection between the motor 46 and the phonograph operating shaft 75. As a result of this arrangement a "silent" film could be run on the motion picture machine and any record or records played on the phonograph as an accompaniment. Also, the afore-mentioned adjustment would be made if a "silent" picture was run and some other form of accompaniment was desired. On this point the radio 14 could be used as the accompanying instrumentality, or the radio could be operated in the ordinary manner without simultaneous operation of the motion picture machine.

It will therefore be evident that with the improved synchronizing and control apparatus, when talking pictures are reproduced, the sound record and film can be easily manually kept in strict synchrony either by speeding up or retarding the operation of the motion picture machine without interfering with the speed of operation of the sound mechanism. Furthermore, the phonograph may be operated with or without simultaneous synchronous operation of the motion picture machine, and vice versa, and the radio can also be operated in lieu of the phonograph with or without operation of the motion picture machine.

Figs. 6 and 7 illustrate a modification of that part of the apparatus between the main motor 46 and the sound reproducing mechanism. The control unit 60' is substantially similar to the similarly disposed control unit 60 previously described and it is operatively connected with the main motor 46 through the gears 59 and 66. The forward shaft 61' in said unit is longitudinally movable to shift gear 62 into and out of engagement with gear 63. The normal drive is from gear 64 on the rear shaft, through gear 59 to gear 62 and shaft 61', and from gear 67 thereon to gear 68, which drives the out-going shaft 69' which may contain a flexible coupling. When, of course, shaft 61' is pushed to the right, gear 62 is disengaged from its driving gear, discontinuing the drive to shaft 69'. In this unit 60', the side plate 95 of the casing may be removed by removing the bolts 96, and the gear 67, on a key on its shaft, as well as the gear 68, may be removed, and said gears may then be replaced by gears of other sizes according to the desired speed ratio to be attained between the motion picture mechanism and the phonograph mechanism.

In this form of the invention the separate motor for the phonograph turn table is eliminated, and the phonograph turn table is driven directly from the motor 46, through the control unit 60'. Referring particularly to Fig. 6 it will be noted that the phonograph turn table 70 is carried by the suitably journaled vertical shaft 71 and the lower end of said shaft has fast thereon a bevel gear 97 meshing with a bevel gear 98 on the shaft 69'. Hence, the phonograph turn table is driven directly from the motor 46 at a predetermined speed through the unit 60' and the reduction gears therein. Also, the drive for the phonograph turn table can be disconnected by a manipulation of the shiftable shaft of the unit 60'. With this form of device it is possible to run a motion picture machine or camera at a given speed ratio with respect to a sound reproducing or recording apparatus with the use of only one motor for operating both the picture machine or camera and the sound reproducing or recording apparatus.

It has before been mentioned that when a talking motion picture is recorded or taken the recording sound mechanism must be synchronized with the photographing mechanism or camera. Inasmuch as the present apparatus (eliminating from consideration the motion picture machine and the sound reproducing mechanism) is an instrumentality for operative interposition between two simultaneously operating machines, which two machines operate at a predetermined speed ratio with respect to each other, it is within the scope of the present invention to interpose the synchronizing and control mechanism between a motion picture camera and a sound recording apparatus for effecting the synchronous operation and control of the two.

As used herein the term "phonograph" is intended to apply to any kind or type of a talking or sound reproducing machine, and not merely to a machine of a particular type.

While one embodiment of the invention has been shown and described, it should be understood that not all of the features need necessarily be made in the exact form or arrangement shown, and various changes and modifications may be made without departing from the spirit of the invention, and the invention is not otherwise limited than by the scope, and the range of equivalency thereof, of the appended claims.

What is claimed as the invention is:

1. In combination, a pair of separated driving shafts, a motor interposed between said shafts, a regulatable mechanical driving connection between said motor and one of said shafts to accelerate or retard rotation of said shaft without affecting the other shaft, and a controllable mechanical connection between said motor and the other of said shafts, there being means in said last connection for maintaining a predetermined speed ratio between the speed of operation of one of said shafts and the normal speed of operation of the other of said shafts.

2. In combination, a pair of separated driving shafts, a motor interposed between said shafts, a regulatable mechanical driving connection between said motor and one of said shafts to accelerate or retard rotation of said shaft without affecting the other shaft, and a controllable mechanical connection between said motor and the other of said shafts, there being interchangeable, reduction gear means in said last connection for maintaining a predetermined speed ratio between the speed of operation of one of said shafts and the normal speed of operation of the other of said shafts.

3. In combination, a pair of shafts, a main motor, a controllable, mechanical driving connection between said main motor and one of said shafts, a second motor, a driving connection between said second motor and the other shaft, and another driving connection between said main motor and the driving connection for the second shaft creating a driving relationship between said motors with respect to said second shaft.

4. In combination, a motion picture machine shaft, a phonograph shaft, a main motor, a controllable, mechanical driving connection between said main motor and the motion picture machine shaft, a secondary motor, a connection between said motors and connected to both of the same and operated thereby, said connection including a gear reduction, and a driven connection extending from said motors connection, from a point between the secondary motor and the gear reduction, to the phonograph shaft for operating the same.

5. Common and associated means for controlling the joint or simultaneous revolution of a pair of spaced revoluble members, comprising a pair of spaced revoluble members, a motor interposed therebetween, a mechanical driving connection between the motor and one of said revoluble members, a gear box operatively intersecting said connection, there being a set of gears in the gear box and the gears being manipulable to retard the normal speed of operation of said driving connection to said revoluble member, a second gear box operatively intersecting said connection and having gears therein manipulable to increase the normal speed of operation of said revoluble member, and an independently controllable driven mechanical connection between said motor and the other revoluble member.

6. Common and associated means for controlling the joint or simultaneous operation of a pair of independent revoluble members, comprising a motor interposed therebetween, a mechanical driving connection between the motor and one of said revoluble members, a gear box operatively intersecting said connection, there being a set of gears in the gear box and the gears being manipulable to retard the normal speed of operation of said driving connection to said revoluble members, a second gear box operatively intersecting said connection and having gears therein manipulable to increase the normal speed of operation of said driving connection to said revoluble member, an independently controllable driven mechanical connection between said motor and the other revoluble member, and reduction gearing and clutch mechanism in said last-mentioned mechanical connection.

7. Common and associated means for controlling the joint or simultaneous operation of a pair of independent revoluble members, comprising a motor interposed therebetween, a mechanical driving connection between the motor and one of said revoluble members, a gear box operatively intersecting said connection, there being a set of gears in the gear box and the gears being manipulable to retard the normal speed of operation of said driving connection to said revoluble member, a second gear box operatively intersecting said connection and having gears therein manipulable to increase the normal speed of operation of said revoluble member or to disconnect said driving connection from the motor, and an independently controllable driven mechanical connection between said motor and the other revoluble member.

8. Common and associated means for controlling the joint or simultaneous operation of a pair of independent revoluble members, comprising a motor interposed therebetween, a mechanical driving connection between the motor and one of the revoluble members, a gear box operatively intersecting said connection, there being a set of gears in the gear box and the gears being manipulable to retard the normal speed of operation of said revoluble member, a second gear box operatively intersecting said connection and having gears therein manipulable to increase the normal speed of operation of said revoluble member, a secondary motor, and a mechanical connection between both of said motors and operated thereby and connected to both of the same, said connection including therein a gear reduction and a clutch mechanism, a driven connection extending from said motors connection, from a point between the secondary motor and the gear reduction, to the other revoluble member.

9. In combination, a variable speed shaft, a constant speed shaft, a main motor, a controllable, mechanical driving connection between said main motor and the variable speed shaft, a second motor, a driving connection between said second motor and the constant speed shaft, another driving connection between said main motor and the constant speed shaft driving connection creating a driving relationship between said motors with respect to said constant speed shaft, an electrical circuit including the first motor, a switch in said circuit, an electrical circuit including the second motor, a switch in said circuit, and a master switch controlling both circuits.

10. In combination, a pair of revoluble shafts, a main motor, a controllable, mechanical driving connection between said main motor and one of said shafts, a second motor, a driven connection between said motors and connected to both of the same, a shock absorbing yieldable connection in said driven connection, and a power take-off extending between said driven connection and the other shaft.

In testimony whereof, I affix my signature.

JEAN B. OLINGER.